2,989,821
TREATED SEED, METHOD OF SEED TREATMENT AND COMPOSITIONS THEREFOR

William S. Blondheim, Westfield, and Abner P. Patton, Springfield, N.J., assignors to American Metal Climax, Inc., New York, N.Y., a corporation of New York
No Drawing. Filed Feb. 3, 1959, Ser. No. 790,822
15 Claims. (Cl. 47—1)

This invention relates to treated seed, seed treatment and compositions therefor and relates more particularly to a method of incorporating a molybdenum-containing compound with seeds of various kinds. The object of the invention is to provide a method of seed treatment whereby molybdenum utilization is improved to the extent that much smaller amounts of such molybdenum-containing compounds than heretofore required for improving growth characteristics of the plant can be effectively applied. Another object of the invention is to provide molybdenum-containing compositions in a form suitable for use in the aforesaid method of seed treatment.

The beneficial effects stemming from the use of molybdenum as an essential trace element fertilizer for promoting the growth and development of higher plants is well known as will be apparent from the discussion relating to molybdenum as a plant nutrient appearing in the article entitled "Trace Elements" on pages 139–145 in the publication "Soil—The Yearbook of Agriculture" (1957) published by the United States Department of Agriculture. It is therein indicated that molybdenum is essentially required for the growth and development of higher plants in general it being shown that more than twenty different crops have been helped by fertilization with molybdenum specifically including alfalfa, sweetclover, peas, citrus, cauliflower, cantaloupe and lettuce among various other types of plants. In addition to improved germination characteristics, significantly improved crop yields are reported, the improvements being generally considered as attributable to the vital role of molybdenum in nitrogen fixation by microorganisms and of nitrogen transformation processes in plants accounting for greatly increased yields in some instances amounting to several-fold yield improvement. In addition to improved germination and generally improved crop yields, the nitrogen content of the plant at maturity is also increased as a result of the molybdenum catalysis occurring in the nitrogen enzyme system of the plant.

Although the aforesaid benefits and advantages may be achieved by mixing a molybdenum-containing compound such as sodium molybdate, molybdic oxide or the like with appropriate fertilizers such as a superphosphate fertilizer and applying the molybdenum-containing fertilizer to the soil, this method of application is rather objectionable since the use of relatively large amounts of molybdenum is ordinarily required for effectively overcoming molybdenum deficiencies of the soil in this manner. The reason for this is the fact that the presence of excessive molybdenum resulting from uneven distribution of the fertilizer or other factors affecting the concentration of the element in the soil can result in excessive accumulation of the trace element or micro-nutrient within the growing plant to a level that is toxic to certain livestock. Dairy cattle and other ruminants are particularly susceptible to a condition known as molybdenosis, this disease being caused by ingestion of fodder containing excessive amounts of molybdenum. Thus the practice of applying a pound or more an acre of soluble molybdenum salts as used by some vegetable growers must be exercised with considerable caution and even where small amounts of molybdenum are applied, the problem of even distribution in the soil remains.

It has been previously proposed to apply molybdenum directly to the seed rather than topdressing the soil. This approach generally consisting of impregnating the seeds with an aqueous solution containing soluble molybdenum has resulted in minimizing the amount of molybdenum required to the extent that approximately two ounces of a soluble molybdenum compound such as sodium molybdate has sufficed for the purpose previously requiring at least ½ pound and generally about a pound applied as topdressing for the soil. This method, however, usually involves an appreciable loss of molybdenum from the time of seed treatment until planting of the seed since drying of the seed as well as mechanical handling results in the physical separation of significant amounts of the seed-coating material from the seed.

Another disadvantage of the known methods of seed treatment is the inability of the seed to retain the applied molybdenum under conditions of excessive moisture in the soil, such conditions frequently resulting in washing away a substantial portion of the molybdenum from direct proximity of the seed thereby making only a fraction of the initially applied material available for utilization by the seed during its subsequent development and growth.

The present invention provides for improvements in the compositions for and method of seed treatment with molybdenum-containing compounds whereby both the retention of molybdenum by the individual seed and the subsequent utilization thereof are enhanced to the point that practically all of the applied molybdenum and other nutrient materials as well as other additive substances that may be additionally incorporated in the seed treatment composition are made directly available for efficient utilization by the seed. Thus the improved method of seed impregnation utilizing new and novel compositions therefor that are hereinafter fully disclosed enables more effective control of the problem of molybdenum deficiency such that said deficiency can be readily overcome with the use of appreciably smaller amounts of molybdenum. The reduced amounts of molybdenum make possible not only a more efficient and economical method of seed treatment but also minimize the occurrence of excessive molybdenum accumulation within the growing plant. Other advantages will become apparent as this specification proceeds.

In accordance with the present invention, the molybdenum-containing compound being utilized as the molybdenum source for utilization by the seed and subsequently the plant is provided in intimate admixture with appropriate amounts of a "sticker" or adhesive substance and a sequestering agent to provide a seed treatment composition which may be readily applied to seed in the form of a stock solution made up by the addition of appropriate amounts of water. The sticker or adhesive substance which also serves as a thickener for the stock solution enables the formation of a suitably adherent seed coating or film containing the molybdenum and sequestering agent and possibly other additive substances such as inoculants, insecticidal, fungicidal and/or pesticidal agents, as well as other nutrients that may optionally be included in the seed treatment composition.

By incorporating the adhesive substance and a sequestering agent in the molybdenum-containing seed treatment composition, several important advantages are derived notably including (a) formation on the surface of the treated and dried seed of a highly adherent film or coating which not only retains the molybdenum and other additive substances in intimate contact with the seed for a prolonged period of time but also precludes the usual losses of molybdenum incurred during mechanical handling particularly after drying the treated seed; (b) improved retention of the nutrient substances once the seed is planted particularly under conditions of excessive moisture which otherwise tend to leach and wash away the additive materials from the proximity of the seed and developing root system; and (c) promoting efficient utilization of molybdenum by minimizing the formation of insoluble molybdenum salts due to the action of precipitate-forming cations present in the soil. It is believed that the sequestering agent is also beneficial in promoting utilization of other micronutrients that are normally present in the soil and are known to be essential or beneficial for plant development and growth.

The inclusion of a sticker or adhesive substance and a sequestering agent of the types hereinafter more fully described further result in increasing the viscosity of the liquid carrier medium utilized in making the stock solution and also provide for greatly improved stability of the stock solution. These advantages are of considerable importance in that the increased viscosity reduces the amount of liquid run-off during the seed treatment step thereby making possible completely effective impregnation with appreciably reduced volumes of stock solution than would otherwise be ordinarily required. This eliminates the need for large mixing tanks and reduces the time for drying the seeds after treatment with practically no loss of the additive substances being incurred. The improved stability of the stock solution facilitates seed treatment in that said solution can be made up and stored for prolonged periods of time without impairment thereof by settling of the additives in the form of a sludge. This also enables achieving uniform distribution of the contained ingredients on the surface of the individual seeds with no difficulty.

The amounts of molybdenum-containing compound, sticker or adhesive substance and sequestering agent comprising the seed treatment composition may be varied somewhat depending upon the characteristics and requirements of the particular seeds being treated, taking into consideration the planting rate of said seeds per acre of soil, the latter being largely determinative of the amount of water required for making up the so-called "stock solution" used in the seed treating process. It is usually desirable to limit the amount of the molybdenum-containing compound to provide generally between ⅛ to ½ oz. of contained molybdenum and preferably about ¼ oz. to the acre (referring to the amount of molybdenum applied to the seed required for planting one acre). Soybean and peanuts, for example, are planted at the rate of one bushel (50–60 pounds) of seed to the acre and for this amount of seed about ¼ oz. of molybdenum is entirely adequate. For alfalfa, clover or other small seeded legumes though, the planting rate may vary as from 15 to 25 or from 25 to 40 pounds of seed per acre; the same amount of molybdenum, namely, about ¼ oz. should be used for the amount of seeds planted to the acre in each instance. The same applies with respect to other legumes as, for example, peas that are planted at the rate of about 135 pounds to the acre. It will be apparent from the foregoing that about 1 oz. of contained molybdenum is all that is needed for the treatment of sufficient seed for planting 4 acres in the usual case. On a dry weight basis, the contained molybdenum of the mixture inclusive of the molybdenum-containing compound, adhesive and sequestering agent generally ranges between 30 and 60% by weight with about 35 to 45% being preferred.

By way of illustration, the use of 2 oz. of sodium molybdate ($Na_2MoO_4$) containing just under 1 oz. of available molybdenum may be used for treating sufficient seed for planting 4 acres in the usual case. The amounts of sticker or adhesive substance and sequestering agent, however, are preferably varied depending upon the quantity of water used in making up the stock solution. As a practical matter, the use of about 1 point of water per bushel of seed has been found to be quite satisfactory. Thus, in the case of peas planted at the rate of approximately 135 pounds per acre totalling 8 bushels of seeds for 4 acres, about 8 pints of water is ordinarily used; in the case of soybeans and peanuts planted at the rate of about 60 pounds per acre totalling about 4 bushels for 4 acres, only about 4 pints of water need be used; where the seed for 4 acres amounts to 1, 2 and 3 bushels the amount of water used in making up the stock solution for effectively dispersing the contained molybdenum and other ingredients would accordingly be about 1, 2 and 3 pints respectively.

Usually a concentration ranging from 0.05 to 0.4% by weight of sticker substance based on the weight of water required for making up the stock solution in any given case is adequate for providing a suitably adherent film of desired characteristics with the use of about 0.2 to 0.3% especially with the use of sodium carboxymethyl cellulose providing excellent results. On a dry weight basis in admixture with sodium molybdate or its equivalent and the sequestering agent, the amount of adhesive substance may range from about 1 to as much as 15% by weight of the mixture with from 2 to 8% being more commonly used. Those skilled in the art can readily ascertain on a trial and error basis the appropriate amount of sticker substance best suited for the particular seed treatment in any given situation.

The amount of sequestering agent, on the other hand, may be varied to provide generally between 0.1 and 10% by weight (based on the overall weight of the dry mixture, including the three basic ingredients) with the use of about 1 to 7% being preferred. On the basis of the weight of water used in making the stock solution, the use of about 0.08 to 0.15% by weight of sequestering agent is ordinarily conducive to good results though somewhat lower and higher concentrations may be used if desired. To some extent, the amount of sequestering agent to be incorporated into the mixture is influenced by the solubility characteristics of the molybdenum-containing compound in that where a completely soluble material such as sodium molybdate is employed, the amount of sequestering agent may be rather small. Where molybdenum salts that are not completely soluble in water are employed, however, it is preferred to use correspondingly larger amounts of sequestering agent. The solubilizing action of the sequestering agent over a period of time promotes efficient utilization of the molybdenum by the seed and growing plant thereby enabling the effective use of molybdenum salts that are not completely soluble in water.

Although sodium molybdate referred to previously constitutes the preferred molybdenum-containing compound for use as a source of molybdenum, it will be understood that other compounds may be used in appropriate amounts including by way of specific examples, ammonium molybdate, molybdic acid, molybdic oxide, sodium phosphomolybdate, sodium silicomolybdate, potassium molybdate and sodium dimolybdate among others. Though the particular compound need not be completely water soluble as previously indicated, it is preferred to use molybdenum-containing compounds that dissolve appreciably or completely in water. Another requirement that should be met thereby is compatibility with inoculant substances and other substances that may be used in seed treatment.

Though various adhesive substances such as gelatin, pectin, starch, tragacanth gum, glue, sodium alginate and the like fall within the contemplation of the present invention as being at least of limited value as sticker or adhesive substances, the use of derivatives of methyl and ethyl cellulose and particularly sodium carboxymethyl cellulose (CMC) is definitely preferred for the purpose in view of its excellent seed coating characteristics. In general, the adhesive substance should (1) have substantial and preferably complete solubility in water, (2) be compatible with inoculants, (3) not decompose readily, ferment or in other ways cause seed rot or retard seed germination, and (4) be amenable to drying without resulting in an excessively sticky treated seed product.

Sequestering agents commonly employed for reacting with ions to form soluble complexes may be incorporated with the mixture in the amounts previously designated. Commercially available substances consisting of organic amine derivatives sold under various trademarks as, for example, Versene and Nullapon B (tetrasodium salt of ethylenediaminetetraacetic acid), Perma Kleer (trisodium hydroxy alkyl ethylenediamine triacetate) and Sequestrene A (tetrasodium salt of ethylenediaminetetraacetic acid wherein a sodium acetyl radical is replaced by alkyl radical) are illustrative of but a few of the numerous sequestering agents that can be used. It should be understood in this connection that the selection of a suitable sequestering agent is not limited to the aforesaid substances but that other types thereof including polyphosphates such as sodium hexametaphosphate, sodium tetrapyrophosphate, sodium tetraphosphate, etc. as well as organic acid chelating agents may also be used providing the same are not destructive of either the seed or the inoculant materials that may also be applied to the seed as may be readily determined by relatively simple tests. As a practical matter and for effecting important savings in cost with respect to packaging, distribution, etc. of the seed treatment composition particularly on a commercial scale, it is preferred to use solid as opposed to liquid ingredients for reasons that are readily apparent and this consideration applies to the preferred choice of sequestering agent as well as the other ingredients thereof.

Representative embodiments of the invention illustrating seed treatment compositions that are applicable for use in seed treatment by making appropriate stock solutions thereof and applying said solution to the seed are shown in the following examples wherein the percentages are by weight. The sodium molybdate used therein is of technical grade of about 97% or higher purity.

*Example I*

For use in the treatment of seeds planted at the rate of about 2 bushels to the acre, the following formulation is preferred, the designated quantity being generally adequate for the treatment of close to 8 bushels of seed corresponding to the amount of seed used for planting 4 acres as in the case of peas or the like:

|  | G. | Percent |
|---|---|---|
| $Na_2MoO_4$ | 56.56 | 87.5 |
| CMC | 3.88 | 6.0 |
| Perma Kleer (#80 cryst.) | 4.21 | 6.5 |
| Total Weight | 64.65 |  |

The above mixture amounting to 2.28 oz. and having a molybdenum content of about 40% amounting to just under 26 grams (less than 1 oz.) is dissolved in about 6 to 8 pints of water, the pH thereof being adjusted by the addition of sufficient acid or alkali depending on which is required to provide a stock solution preferably between 7.0 and 7.2. The stock solution may then be used directly for seed treatment as such or in modified form containing other ingredients as inoculants, compatible fungicidal agents, other micronutrients, etc., which may be optionally included in the formulation as previously mentioned.

*Example II*

A seed treatment composition similar to that of the preceding example but differing principally with regard to the relative amounts of adhesive substance and sequestering agent incorporated in the mixture is illustrated below, said mixture amounting in the aggregate to 2.07 oz. with the contained molybdenum therein being about 42%.

|  | G. | Percent |
|---|---|---|
| $Na_2MoO_4$ | 54.21 | 92.37 |
| CMC | 1.64 | 2.81 |
| Perma Kleer (#80 cryst.) | 2.83 | 4.83 |

This formulation again containing just under 1 oz. of molybdenum is preferred for use in the treatment of seed sufficient for planting about 4 acres wherein the planting rate is a bushel or less per acre as in the case of alfalfa seed or the like. The amount of water to be used in making the stock solution therewith would accordingly be about 4 pints or even less for such applications.

*Example III*

The treatment of seed in connection with truck farming presents a somewhat different problem from that involved in acreage planting. For truck farming applications, seeds are usually planted in comparatively small lots generally ranging from ½ a pound to several pounds. A suitable formulation for treating such seed consists of the following:

|  | G. | Percent |
|---|---|---|
| $Na_2MoO_4$ | 32.00 | 94.95 |
| CMC | 0.95 | 2.82 |
| Perma Kleer | 0.75 | 2.23 |

This mixture of about 44% by weight contained molybdenum dissolved in one pint of water is adequate for treatment of about 32 pounds of lettuce seed and the like.

The seed treatment process may be easily and readily carried out by adding the prerequisite amount of water to the aforesaid mixture of ingredients to form the stock solution which may then be applied to the seed in any desired manner as by thoroughly mixing the seed therewith in a mixing tank or vessel. This treatment, after appropriate drying of the seed, results in the formation on the individual seeds of an adherent film or coating of an entirely homogeneous composition which is highly resistant to flaking or shedding thereby eliminating the usual losses of nutrients and other seed additives.

The pH of the stock solution should preferably be between 6.8 and 7.5 and optimally between 7.0 and 7.2. Accordingly, if pH adjustment is required, appropriate amounts of either an acid such as citric or phosphoric and the like or an alkaline reagent such as lime, sodium hydroxide and the like may be added as the case may be to bring the pH to within the desired level. The pH adjustment can be provided for by including the acid or base as a component of the dry mixture of ingredients or alternatively, the pH may be adjusted while making up the stock solution as previously indicated in Example I.

As previously mentioned, other substances as inoculants, insecticidal, fungicidal and pesticidal agents and the like may also be advantageously included in the seed treatment composition. Care should be exercised, however, to preclude those substances which in the amounts normally used might tend to adversely affect the germination properties of the seed or be destructive of the inoculant substances, such as Rhizobia strains and the like that are conventionally used for promoting plant growth.

It will be understood that the term "solution" as used herein referring to the aqueous mixture of ingredients comprising the stock solution is not to be construed as necessarily meaning a true solution in the strictest sense but that homogeneous mixtures of a colloidal nature as well as substantially homogeneous dispersions containing some undissolved phase are meant to be included thereunder. For example, a colloidal solution which is macroscopically homogeneous but microscopically heterogeneous is obtained with the use of most thickener substances. Similarly, where other than completely soluble molybdenum-containing compounds or other ingredients are used, the resulting aqueous solution or stock solution made therewith is bound to contain at least some undissolved phase.

Having thus described this invention, it will be apparent to those skilled in the art that other modifications are possible. It should therefore be understood that within the scope of the appended claims, this invention may be practiced otherwise than as specifically described.

What is claimed is:

1. A method of treating seeds before planting which comprises making up a stock solution utilizing approximately a pint of water per bushel of seed to be treated, said stock solution including (a) a molybdenum-containing compound in an amount sufficient to provide about ⅛ to ½ ounce of available molybdenum for the quantity of seeds used in normally planting one acre, (b) a substantially water-soluble film-forming adhesive substance in the amount of 0.1 to 0.4% by weight based on the water content of said stock solution, and (c) a small but effective amount of a sequestering agent, applying said stock solution to said seeds and thereafter removing excess moisture to form an adherent, non-dusting homogeneous film covering the endosperm of the individual seeds.

2. The method of claim 1 wherein the stock solution is adjusted to a pH between 6.8 and 7.5 before applying said stock solution to the seeds.

3. A composition of matter for use in seed treatment comprising, in admixture, (a) a molybdenum-containing compound that is appreciably if not completely water-soluble, (b) a water-soluble, film-forming adhesive substance, and (c) a sequestering agent selected from the group consisting of alkali metal salts of aminopolycarboxylic acids and derivatives thereof, inorganic phosphates and polyphosphates respectively, said mixture being compatible with inoculant substances associated with said seeds and characterized by its ability to form an adherent, homogeneous, non-dusting film or coating covering the endosperm of the individual seeds upon application of the same as an aqueous stock solution thereto and upon subsequent removal of excess moisture.

4. A composition of matter for use in seed treatment comprising, in admixture, (a) a substantially water-soluble molybdenum-containing compound that is compatible for use with seed inoculants, (b) a film-forming adhesive substance selected from the group consisting of water-soluble derivatives of methyl and ethyl cellulose, and (c) a sequestering agent selected from the group consisting of alkali metal salts of aminopolycarboxylic acids and derivatives thereof, inorganic phosphates and polyphosphates respectively, said mixture being characterized by its ability to form an adherent, homogeneous, non-dusting film or coating covering the endosperm of the individual seeds when applied as an aqueous stock solution thereto and upon subsequent removal of excess moisture.

5. A seed treatment composition comprising, in admixture, a molybdenum-containing compound, an adhesive substance selected from the group consisting of water-soluble derivatives of methyl and ethyl cellulose and a sequestering agent selected from the group consisting of alkali metal salts of aminopolycarboxylic acids and derivatives thereof, inorganic phosphates and polyphosphates respectively, the available molybdenum content in the mixture ranging from 30 to 60% by weight, with the adhesive substance and the sequestering agent being present in the amounts of 1 to 15% and 0.1 to 10% respectively, said composition being characterized by its ability to coat the individual seeds with an adherent, homogeneous, non-dusting film upon application of an aqueous stock solution thereof and upon subsequent removal of excess moisture.

6. The composition of claim 5 wherein the molybdenum-containing compound is sodium molybdate.

7. The composition of claim 5 wherein the adhesive substance is sodium carboxymethyl cellulose.

8. The composition of claim 4 further including a seed inoculant substance.

9. The composition of claim 4 wherein at least one additive selected from the group consisting of fungicidal, pestical and insecticidal agents is additionally included in the mixture.

10. A method of treating seeds to improve the crop yield therefrom after planting, which comprises the steps of applying to said seeds an aqueous stock solution containing additive ingredients essentially including a molybdenum-containing compound, a substantially water-soluble, film-forming adhesive substance and a sequestering agent and removing excess moisture to develop an adherent, homogeneous, non-dusting film or coating on the endosperm of the individual seeds.

11. A method of treating seeds to improve the crop yield therefrom after planting, which comprises the steps of applying to said seeds an aqueous stock solution containing a molybdenum-containing compound, a film-forming adhesive substance and a sequestering agent all of which ingredients are substantially completely soluble in water and removing excess moisture to develop an adherent, homogeneous dust-free film or coating covering the endosperm of the individual seeds.

12. A treated seed of the kind wherein the seed is encased in a coating, said treated seed being characterized by a water-soluble, adherent film covering the endosperm of said seed, said film being resistant to flaking and shedding and essentially including in homogeneous admixture a molybdenum containing compound, a water-soluble film-forming adhesive substance and a sequestering agent selected from the group consisting of alkali metal salts of aminopolycarboxylic acids and derivatives thereof, inorganic phosphates and polyphosphates respectively.

13. A treated seed of the kind wherein the seed is encased in a coating, said treated seed being characterized by a water-soluble, adherent film covering the endosperm of said seed, said film being resistant to flaking and shedding and including in homogeneous admixture sodium molybdate, sodium carboxymethyl cellulose and a sequestering agent selected from the group consisting of alkali metal salts of aminopolycarboxylic acids and derivatives thereof, inorganic phosphates and polyphosphates respectively.

14. A seed treatment composition comprising, in admixture, a molybdenum-containing compound, an adhesive substance selected from the group consisting of water soluble derivatives of methyl and ethyl cellulose and an organic amine sequestering agent, the available molybdenum content in the mixture ranging from 30 to 60% by weight, with the adhesive substance and sequestering agent being present in the amounts of 1 to 15% and 0.1 to 10% respectively, said composition being characterized by its ability to coat the individual seeds with an adherent, homogeneous, non-dusting film upon application of an aqueous stock solution thereof and upon subsequent removal of excess moisture.

15. A seed treatment composition comprising, in admixture, a molybdenum-containing compound, an adhesive substance selected from the group consisting of water soluble derivatives of methyl and ethyl cellulose and a sequestering agent, the available molybdenum content in the mixture ranging from 30 to 60% by weight, with the adhesive and sequestering agent being present in the amounts of 1 to 15% and 0.1 to 10% respectively, said composition additionally containing a compound selected from the group consisting of compatible acid and alkali compounds in an amount sufficient to provide a pH between 6.8 and 7.5 upon dissolving the admixed material in water, said composition being characterized by its ability to coat individual seeds with an adherent, homogeneous, non-dusting film upon application of an aqueous stock solution thereof and upon subsequent removal of excess moisture.

References Cited in the file of this patent

UNITED STATES PATENTS

| | | |
|---|---|---|
| 2,502,809 | Vogelsang | Apr. 4, 1950 |
| 2,651,883 | Hedrick | Sept. 15, 1953 |
| 2,648,165 | Nestor | Aug. 11, 1953 |
| 2,828,182 | Cheronis | Mar. 25, 1958 |

FOREIGN PATENTS

| | | |
|---|---|---|
| 62,875 | Denmark | Oct. 23, 1944 |
| 861,257 | Germany | Dec. 29, 1952 |
| 741,378 | Great Britain | Nov. 30, 1955 |

OTHER REFERENCES

Publications: "Growth Hormones in Plants" (Boysen-Jensen et al.), published by McGraw-Hill (N.Y.), 1936. Pages 49 and 50 relied on, article "Yeast, A Source of Heteroauxin."

"Condensed Chemical Dictionary," Fifth edition, published by Reinhold (N.Y.), 1956. Pages 253, 254, 974 are relied on.

"Chemistry of the Metal Chelate Compounds" (Martell et al.), published by Prentice-Hall (Englewood Cliffs, N.J.), 1956. Pages 388 through 392 and page 445 are relied on.

"Condensed Chemical Dictionary," Fifth edition, published by Reinhold (New York), 1956. Page 284 relied on.

Cohen et al.: "Metal-Chelating Properties of Plant-Growth Substances," published March 8, 1958 in "Nature" (magazine, London, England), volume 181, No. 4610, pages 686 and 687.